V. T. GILCHRIST.
FRACTIONAL DISTILLATION PROCESS AND APPARATUS.
APPLICATION FILED MAR. 30, 1916.

1,386,467.

Patented Aug. 2, 1921.
2 SHEETS—SHEET 2.

WITNESSES:

INVENTOR
Vincent T. Gilchrist.
BY
Baldwin Vale ATTORNEY

UNITED STATES PATENT OFFICE.

VINCENT T. GILCHRIST, OF SAN FRANCISCO, CALIFORNIA, ASSIGNOR, BY MESNE ASSIGNMENTS, TO SUPERIOR REFINING PROCESS CO., OF SAN FRANCISCO, CALIFORNIA, A CORPORATION OF CALIFORNIA.

FRACTIONAL-DISTILLATION PROCESS AND APPARATUS.

1,386,467.  Specification of Letters Patent.  Patented Aug. 2, 1921.

Application filed March 30, 1916. Serial No. 87,860.

*To all whom it may concern:*

Be it known that I, VINCENT T. GILCHRIST, a citizen of the United States, residing at the city and county of San Francisco, State of California, have invented a new and useful Improvement in Fractional-Distillation Processes and Apparatus, of which the following is a specification.

This invention relates particularly to fractionating or separating from crude petroleum vapors the various products of lighter specific gravities, such as gasolene, engine distillates, kerosene and the like, with the particular object of effecting such separation with a minimum expenditure of fuel.

In the specification and the annexed drawings, I illustrate the invention in the form that I consider the best, but it is to be understood that I do not limit myself to such form, because the said invention may be embodied in other forms; it is also to be understood that in and by the claims following the description I desire to cover the invention in whatever form it may be embodied.

The products derived from crude petroleum are taken off at various temperatures, the lighter products of lower specific gravity are given off at relatively low vaporizing temperatures and the products of greater specific gravity have correspondingly higher vaporization temperatures. Vapors derived from crude petroleum at any temperature contain a variable quantity of a series of hydrocarbons with different vaporizing temperatures, hence it is possible with these vapors to condense a portion, the residual vapor after such fractional condensation being of a lower temperature than that of the original vapor. If the fractional condensation occurs in a series of stages, the condensates will vary in specific gravity, the first condensate being the heavier and the final condensate the lighter. With each fractional condensation both latent and sensible heat is given out and it is one of the objects of this invention to utilize this heat heretofore lost in the condensing medium employed, usually water. The heat is utilized in refractionating the partial condensates, this being the medium employed to effect the partial condensation of the original vapor.

The condensates obtained by each partial condensation are like the vapors, made up of a series of hydrocarbons of varying vaporizing temperatures, and it is the object of refractionation to remove the lightest constituents of each series of condensates, the residual liquid then being sent to the next still operating at a higher temperature, and so on through the various stages until the last cut is made.

In the accompanying two sheets of drawings.

The apparatus for carrying out this process consists of a series of primary and a series of secondary condensing units, combined and interconnected in a novel manner that will be more particularly described hereinafter.

Figure 1:
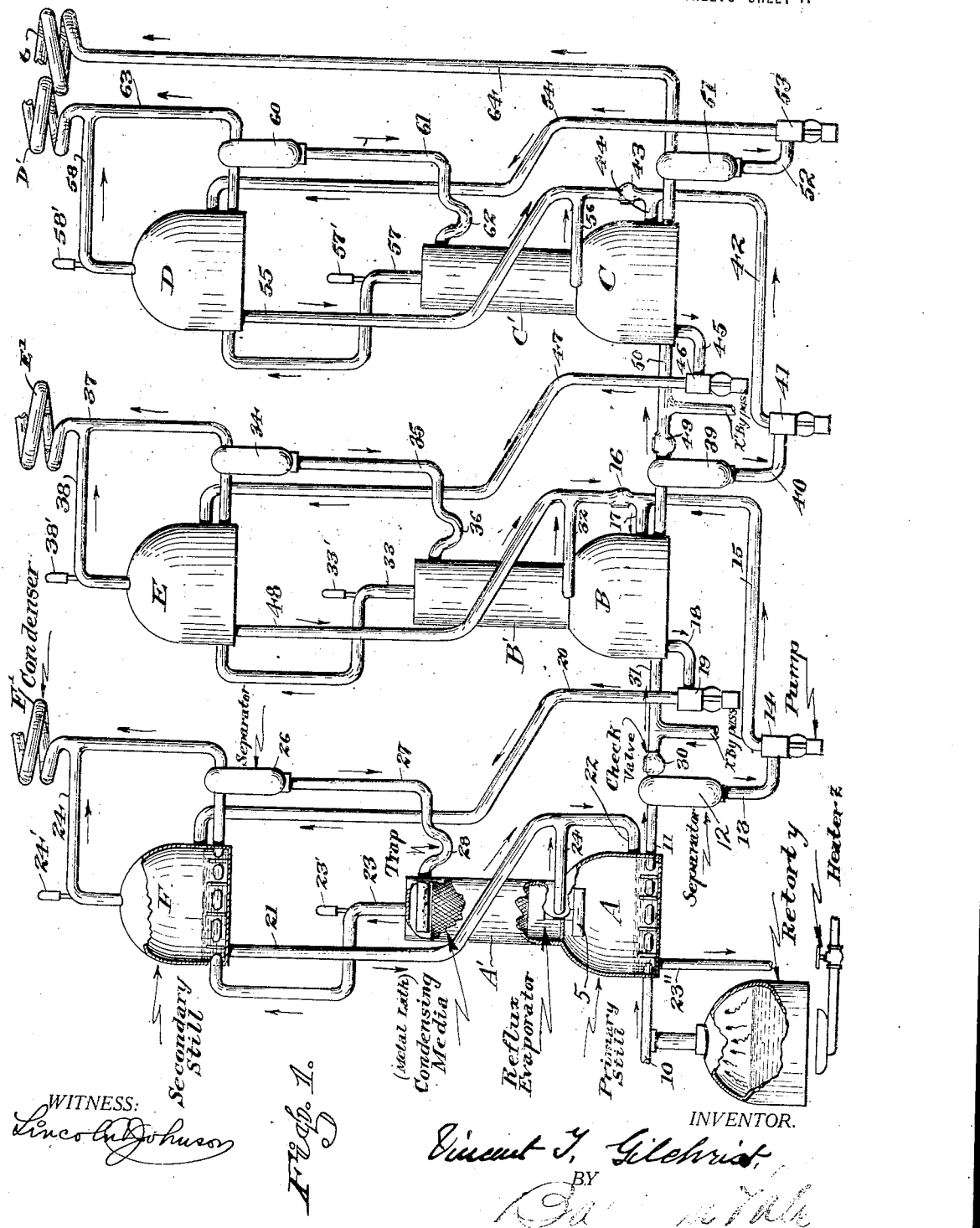
Figure 1 is a diagrammatic front elevation of a distillation apparatus combined and arranged in accordance with this invention.
Figure 2:
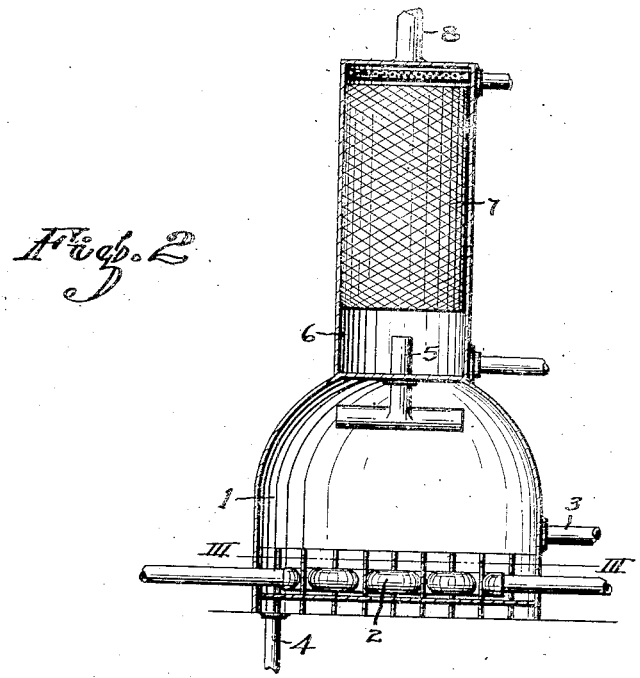
Fig. 2 is a vertical cross section of a primary still with a superimposed dephlegmator column.
Figure 3:
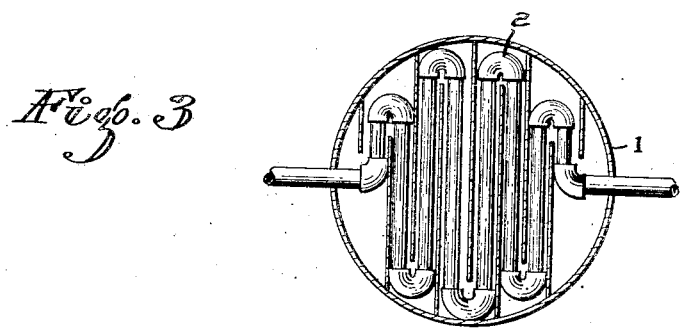
Fig. 3 is a plan view of the same in perspective taken on the line III—III, Fig. 2.

In detail the primary unit illustrated in Fig. 2 consists of the dome 1 having the heating coil 2 arranged in the bottom thereof, the various return sections of the coil are separated by upstanding baffle-plates resting upon the bottom of the dome 1 and alternately connected to alternate sides of the dome, to cause the condensates contained within the dome to follow a tortuous path over the heating coil from the inlet to the outlet of the dome. The vapors evolved within the dome pass therefrom to the outlet pipe 5 leading into the reflux evaporator 6 preferably located immediately above the dome. This reflux evaporator consists of a vertical, cylindrical chamber filled with some suitable condensing media, that preferred by me being a roll of what is known in the trade as expanded metal lath 7. This material presents a maximum amount of condensing surface with a minimum amount of material. The lath 7 completely fills the diameter of the chamber preventing the incoming vapors from short circuiting up the sides, compelling them to follow a tortuous path through the condensing media 7. The vapors escape through the outlet pipe 8 to the heating coil in the secondary still to which it is connected.

The secondary still F is similar to the primary still in every respect, except that the capacity may be less, as it handles a reduced quantity of vapor. The arrangement of the heating coils and the inlet and outlets are alike, the description of the primary still serving for both.

The apparatus required to perform the required functions of partial condensation and refractionation of the condensate, consists of one of several sets or series of units; the number of units required depends upon the character of the petroleum being treated and the number of commodities desired removed. The crude oil still or retort Y for producing the crude vapor and condensers for liquefying the various commodities produced, may be of any of the well known types, all of which are available in the practice of this invention and not being germane thereto details thereof are omitted from the illustration and description. The crude oil vapors are given out from the crude oil still Y heated by the burner Z at a temperature between 500° and 600° Fahrenheit, and pass through the pipe 10 into the heating coils in the first primary still A. The condensates condensed within the heating coil in the first primary still pass therefrom through the pipe 11, where they drop into the separator 12 from which they flow through the pipe 13 to the pump 14 that forces them under pressure through the pipe 15 against the check valve 16, causing the condensates to flow through the pipe 17 into the second primary still B. In the still B the condensate follows a tortuous course from the inlet 17 between the baffle plates over the heating coil in the bottom of the still, giving off by evaporation its lighter vapors, the remaining condensates flowing out of the still B through the outlet 18 into the pump 19 which forces it under pressure through the pipe 20 into the secondary still F, wherein it flows its tortuous course between the baffle plates over the heating coil in the bottom of the secondary still F, the remaining condensates escaping through the outlet 21 and flowing back through the inlet 22 to the primary still A wherein it travels a tortuous course between the baffle plates over the heating coil therein, giving off by evaporation its lighter vapors by absorbing the heat of the heating coil, until it passes out of the primary still A through the outlet 23″, having given off all of its lighter constituent vapors. The vapors thus generated in the primary still A pass upward through the internal outlet pipe 5 leading into the first reflux evaporator A¹, wherein the vapors condense on the surface of the condensing media 7 and drain back and flow through the pipe 24 to the pipe 22 into the primary still over the heating coil as previously described. From the dephlegmator A¹ the vapors rise through the pipe 23 and enter the heating coil arranged in the bottom of the secondary still F, heating the condensates flowing therethrough and driving off the vapors therefrom which escape from the dome through the pipe 24 to the condenser F¹, which may be water cooled or of any other type. The precipitation of condensate within the heating coil in the bottom of the secondary still F flows into the separator 26, and flows back through the pipe 27, through the vapor trap 28, and is distributed by the perforated pipe into the top of the dephlegmator A¹ and over the condensing surface therein which it cools, promoting the condensing of the rising vapor from the still A, being itself evaporized by the heat of such rising vapors, draining back through the primary still A and escaping therefrom through the pipe 23″, to be re-run through the crude oil still or otherwise disposed of. The lighter vapors passing from the heating coil in the bottom of the secondary still F pass through the pipe 29 into the condenser F′, the products of this condenser being a clearly defined commercial cut. In this first step A and F all of the products having an evaporating point at or near the heat of the incoming crude oil vapors, for example, between 500 and 600 degrees Fahrenheit are given off, such vapors passing from the dome of the secondary still F through the pipe 24 to the condenser F′.

The vapors escaping from the heating coil in the first primary still A give off their condensates in the separator 12 and pass through the check valve 30 into the pipe 31, leading into the heating coil disposed in the bottom of the primary still B, heating the condensates flowing thereover from the inlet pipe 17, causing them to give off their vapors which pass upward from the still into the dephlegmator B¹ in passing through which they give off condensates that flow back through the pipes 32 through the check valve 16 into the primary still B, following a course therethrough previously described.

The vapors from the dephlegmator B¹ pass upward through the outlet pipe 33 into the heating coil disposed in the bottom of the primary still E; the condensates from this coil passing into the separator 34 and flowing back through the pipe 35 and the trap 36 into the dephlegmator B¹, from which they flow outward through the pipe 32 and mingle with the condensates from the dephlegmator passing back into the primary still B through the pipe 17. The uncondensed vapor from the heating coil in the secondary still E passes the separator 34 into the pipe 37 connected with a condenser E¹ the product of which represents a commercial fractionation or cut.

The condensates precipitated in the heating coil in the bottom of the primary still B, flow into the separator 39, and through the pipe 40 into the pump 41, from which they are forced under pressure through the pipe 42 against the check valve 43 into the inlet pipe 44 leading into the primary still C through which they take a tortuous path between the plates therein, flowing over the heating coils disposed in the bottom of this still C; the heat of the coil driving off the lighter vapors until the condensates flow down through the outlet pipe 45 into the pump 46. From the pump 46 the condensates are pumped under pressure through the pipe 47 into the secondary still E, where they flow through a tortuous course around the heating coils in the bottom thereof, giving off their lighter vapors, the remaining condensates passing through the outlet into the pipe 48, flowing back through the check valve 16 and into the primary still B wherein they give off their lighter vapors and flow into the pipe 18, taking the course previously described. The vapors driven off in the secondary still E pass through the pipe 38 to the condenser E', the product of which is a defined cut.

The original crude oil vapor entering the pipe 10 becomes gradually cooled as it passes from the primary still A giving off a cut at the separator 12, then passing on into the primary still B, giving off a cut in the separator 39, then passing through the check valve 49, into the pipe 50 leading to the heating coil disposed in the bottom of the primary still C wherein another condensate is formed and removed by the separator 51 from which it flows through the pipe 52 into the pump 53 and is forced under pressure therefrom through the pipe 54 to the secondary still D making its tortuous way over the heating coil in the bottom of the secondary still D, giving off its vapors therein and flowing down through the outlet pipe 55 through the check valve 43 into the pipe 44, through the primary still C mingling with the condensates pumped into this still through the pipe 44, and taking the course previously described.

The vapors given off in the primary still C pass upward into the dephlegmator C¹, the condensates therein flowing back through the pipe 56 into the primary still C, the vapors rising through the dephlegmator C¹ pass into the pipe 57 and flow through the heating coil disposed in the bottom of the secondary still D heating the condensates flowing therethrough and driving off the lighter vapors that pass through the pipe 58 connected with the condenser D', the products of which form a commercial cut.

The condensates formed in the heating coil in the bottom of the secondary still D pass into the separator 60, from which they flow back through the pipe 61, the trap 62, into the dephlegmator C'. The lighter vapors passing the separator 60 into the pipe 63, pass to the condenser C'. The vapors passing the last separator 51 pass into the pipe 64 leading to a suitable condenser G, the product of which represents a commercial cut in the process.

The apparatus shown and described consisting of three sets of primary and secondary stills, gives four distinct fractionations or cuts, one each from the stills D, E and F, and one from the primary heating coils discharging through the condenser G. The last cut through the condenser G representing lighter cuts, such as gasolene, the specific gravity decreasing with each of the secondary stills, D, E, F, in the order named, the by-products or residuum passing off through the pipe 23. The various sets of stills should be provided with safety valves as at 23', 24', 33', 38', 57' and 58', in each set to relieve any excess pressure that may be generated in the apparatus.

The by-passes x, x' leading into the primary heating coil pipe provide means for introducing crude vapors at reduced temperature at these points. For instance, if the crude oil vapor entering the pipe 10 has a temperature, for instance, of 500° F., vapor may be introduced at approximately 375° F. at the by-pass x and at 250° F. at the by-pass x', or at temperatures about in these proportions.

In carrying out this process with the apparatus described, the original crude oil vapor is progressively cooled in its passage through the primary stills giving off its condensates at stated temperatures; which condensates are in turn progressively heated in the secondary stills by the vapors given off by their corresponding primary stills, whereby the heat given off in the primary still is utilized to refractionate the condensates therefrom, resulting in a high point of general efficiency in the apparatus, the only lost heat being that necessary in the final condensers for condensing the variously defined fractional cuts.

Whereas the invention resides particularly within the primary and secondary distilling apparatus, it is to be understood that this apparatus operates in combination with crude oil stills for generating the crude oil vapor in the first instance, and with the condensers for the final condensation of the fractional constituents.

Having thus described this invention, I claim:

1. The method of fractionating vapor consisting in progressively separating the vapor at certain temperatures during its passage to obtain condensates, fractionally distilling each successive condensate by the heat of the vapor previously separated therefrom, whereby an additional condensate and an additional vapor are obtained, and in further heating each successively formed condensate by the heat of vapor of the next previously formed condensate.

2. The method of fractionating vapor consisting in progressively separating condensates from the vapor at certain temperatures during its passage, raising the temperature of the vapor separated from each condensate, fractionally distilling each successive condensate by the heat of vapor previously separated therefrom to obtain an additional condensate and an additional vapor, and in further heating each of the successively formed condensates in reversed progressive order by the heat of vapor of next previously formed condensate.

3. A refractional distilling apparatus comprising a series of primary stills having means for progressively cooling vapor in its passage therethrough to obtain condensates, and a series of secondary stills having means for heating said condensates by the heat given off by the vapor in corresponding primary stills.

4. A refractional distilling apparatus comprising a series of primary stills having means for progressively cooling vapor in its passage therethrough to obtain condensates, a series of secondary stills having means for heating said condensates by the heat given off by the vapor in corresponding primary stills, and means between each corresponding primary and secondary still whereby the condensate from the secondary still may be refractioned by the heat given off in the primary still.

5. A refractional distilling apparatus comprising a series of primary stills having means for progressively cooling vapor in its passage therethrough to obtain condensates, a series of secondary stills having means for heating said condensates by the heat given off by vapor in corresponding primary stills, and means between each corresponding primary and secondary still whereby the condensates from both the primary and the secondary stills are refractionated by the heat given off in the primary still.

6. A fractional distillation apparatus including a series of primary stills and a series of secondary stills; heating means in said stills; separators connected with said heating means and discharging into the succeeding primary stills; certain of said primary stills discharging into said secondary stills and condensers connected with said secondary stills.

7. A fractional distillation apparatus including a series of primary stills; intercommunicating heating means in said primary stills; separators in said heating means between said primary stills and discharging into the succeeding primary still; a series of secondary stills; heating means in said secondary stills communicating with said primary stills; and condensers connected to each secondary still.

8. A fractional distillation apparatus including a series of primary stills; intercommunicating heating means in said stills; separators in said heating means between said stills and discharging into the succeeding still; a series of secondary stills having heating means therein connected with the adjacent primary still; and separators in said heating means in the secondary stills and communicating with the adjacent primary still.

9. A fractional distillation apparatus including a series of primary stills, so connected that the condensates of one still discharges into the succeeding primary still; secondary stills connected to each primary still so that the vapors from the primary still flow through heating means in the secondary still the condensates therefrom flowing back into the primary still; and fractional condensers connected to said secondary stills.

10. A fractional distillation apparatus including a series of primary stills having heating means therein; separators in said heating means between said stills; means for flowing the condensates from said separators over the heating means in the succeeding primary still; secondary stills having heating means therein connected with the adjacent primary still; means for flowing the condensates from said primary still over the heating means in the secondary still of the preceding primary still, means for returning the condensates from the secondary stills back into the adjacent primary still; and means for condensing the fractional vapors of each secondary still.

11. A fractional distillation apparatus including a series of primary stills having heating means therein; separators in said heating means between said stills; means for flowing the condensates from said separators over the heating means in the succeeding primary still; secondary stills having heating means therein; dephlegmators interposed between the primary stills and their adjacent secondary still; separators connected with the heating means in the secondary stills and discharging back into their adjacent primary stills; means for flowing the condensates from each primary still over the heating means in the secondary still of the preceding primary still; and means for condensing the fractional vapors from each secondary still.

12. A fractional distillation apparatus including primary stills and secondary stills arranged in sets; heating means in said primary and said secondary stills; means for flowing the condensates from the heating means in the primary stills over the heating means in the succeeding primary still; means for flowing the vapors from the primary stills through the heating means in the secondary still of that set; means for flowing the condensates from each primary still over the heating means in the secondary still of the preceding set; and means for condensing the fractional vapors of each secondary still.

13. A fractional distillation apparatus including primary stills and secondary stills arranged in sets; heating means in said primary and said secondary stills; means for flowing the condensates from the heating means in the primary stills over the heating means in the succeeding primary still; means for flowing the vapors from the primary stills through the heating means in the secondary still of that set; means for flowing the condensates from each primary still over the heating means in the secondary still of the preceding set; means for flowing the condensates from each secondary still back into the primary still of its set; and means for condensing the fractional vapors of each secondary still.

14. A fractional distillation apparatus including primary stills and secondary stills arranged in sets; heating means in said primary and said secondary stills; means for flowing the condensates from the heating means in the primary stills over the heating means in the succeeding primary still; means for flowing the vapors from the primary stills through the heating means in the secondary still of that set; means for flowing the condensates from each primary still over the heating means in the secondary still of the preceding set; means for flowing the condensates from each secondary still back into the primary still of its set; means for flowing the condensates from the heating means of the secondary stills back into the primary still of that set; and means for condensing the fractional vapors of each secondary still.

15. A fractional distillation apparatus including primary stills and secondary stills arranged in sets, heating means in said primary and said secondary stills; means for flowing the condensates from the heating means in the primary stills over the heating means in the succeeding primary still; means for flowing the vapors from the primary stills through the heating means in the secondary still of that set; means for flowing the condensates from each primary still over the heating means in the secondary still of the preceding set; means for flowing the condensates from each secondary still back into the primary still of its set, in combination with a crude vapor still connected with the heating means in the first primary still.

16. A fractional distillation apparatus including primary stills and secondary stills arranged in sets, heating means in said primary and said secondary stills; means for flowing the condensates from the heating means in the primary stills over the heating means in the succeeding primary still; means for flowing the vapors from the primary stills through the heating means in the secondary still of that set; means for flowing the condensates from each primary still over the heating means in the secondary still of the preceding set; means for flowing the condensates from each secondary still back into the primary still of its set; in combination with crude vapor stills connected with the heating means in said primary stills at intervals between said primary stills.

In testimony whereof, I have hereunto set my hand at San Francisco, California, this 2nd day of March, 1916.

VINCENT T. GILCHRIST.

In the presence of—
BALDWIN VALE,
VICTOR ETIENNE, Jr.